July 11, 1961 A. J. ZUERCHER 2,991,603
STACK HANDLING MACHINE FOR NEWSPAPERS AND THE LIKE
Filed March 30, 1959 11 Sheets-Sheet 1

INVENTOR.
ANTHONY J. ZUERCHER
BY
Kenyon & Kenyon
ATTORNEYS

July 11, 1961    A. J. ZUERCHER    2,991,603
STACK HANDLING MACHINE FOR NEWSPAPERS AND THE LIKE
Filed March 30, 1959    11 Sheets-Sheet 4
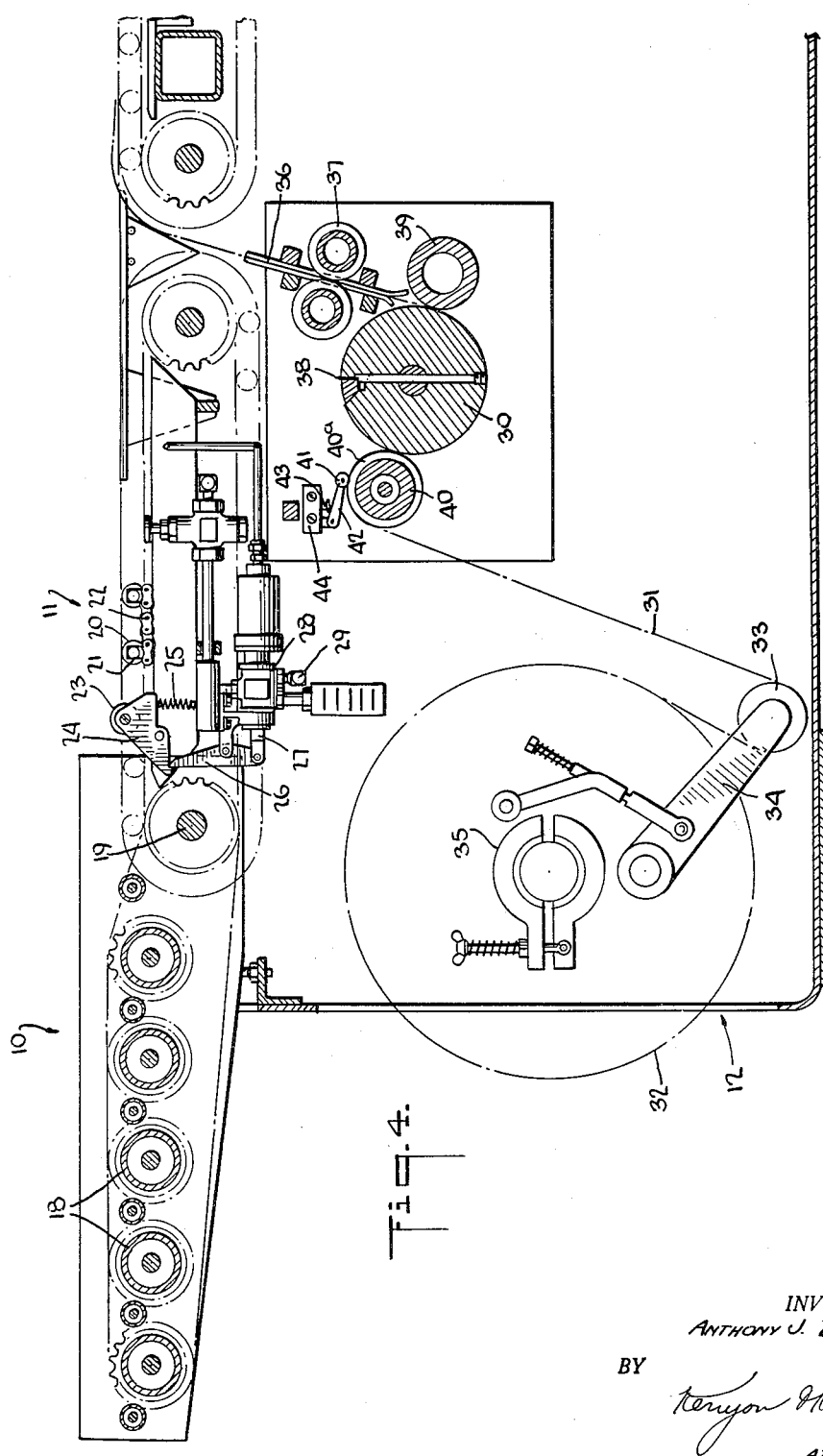
INVENTOR.
ANTHONY J. ZUERCHER
BY
ATTORNEYS

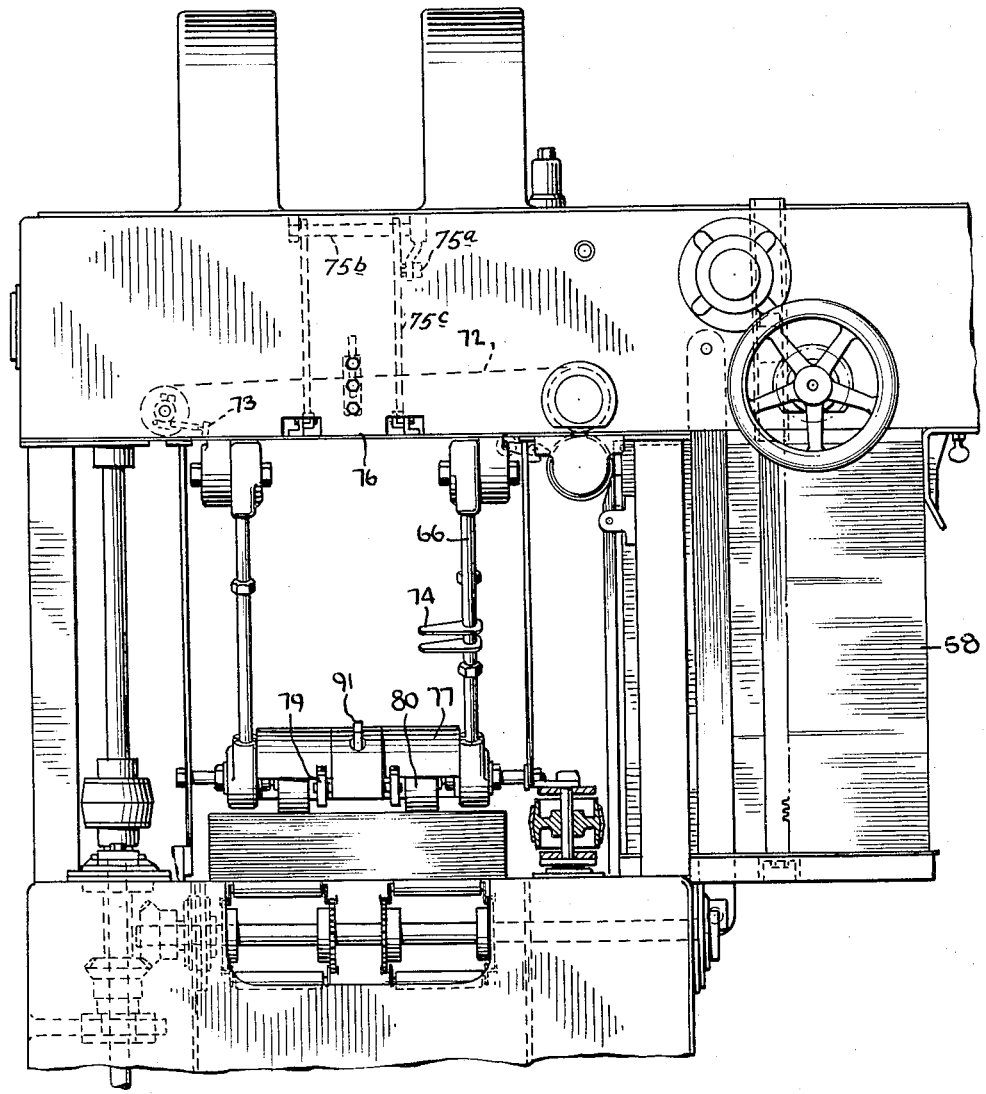

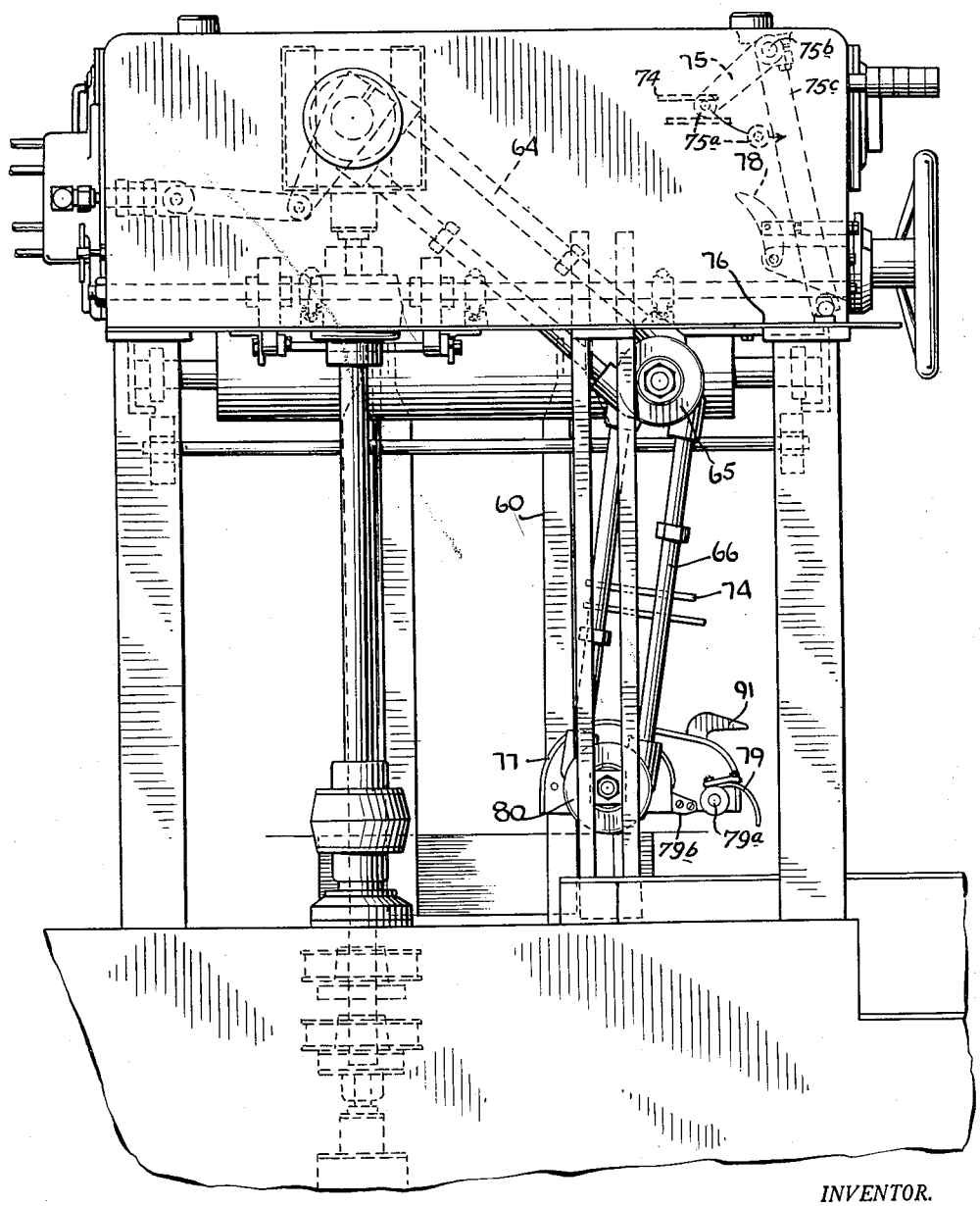

INVENTOR.
ANTHONY J. ZUERCHER
BY
ATTORNEYS

July 11, 1961 A. J. ZUERCHER 2,991,603
STACK HANDLING MACHINE FOR NEWSPAPERS AND THE LIKE
Filed March 30, 1959 11 Sheets-Sheet 10
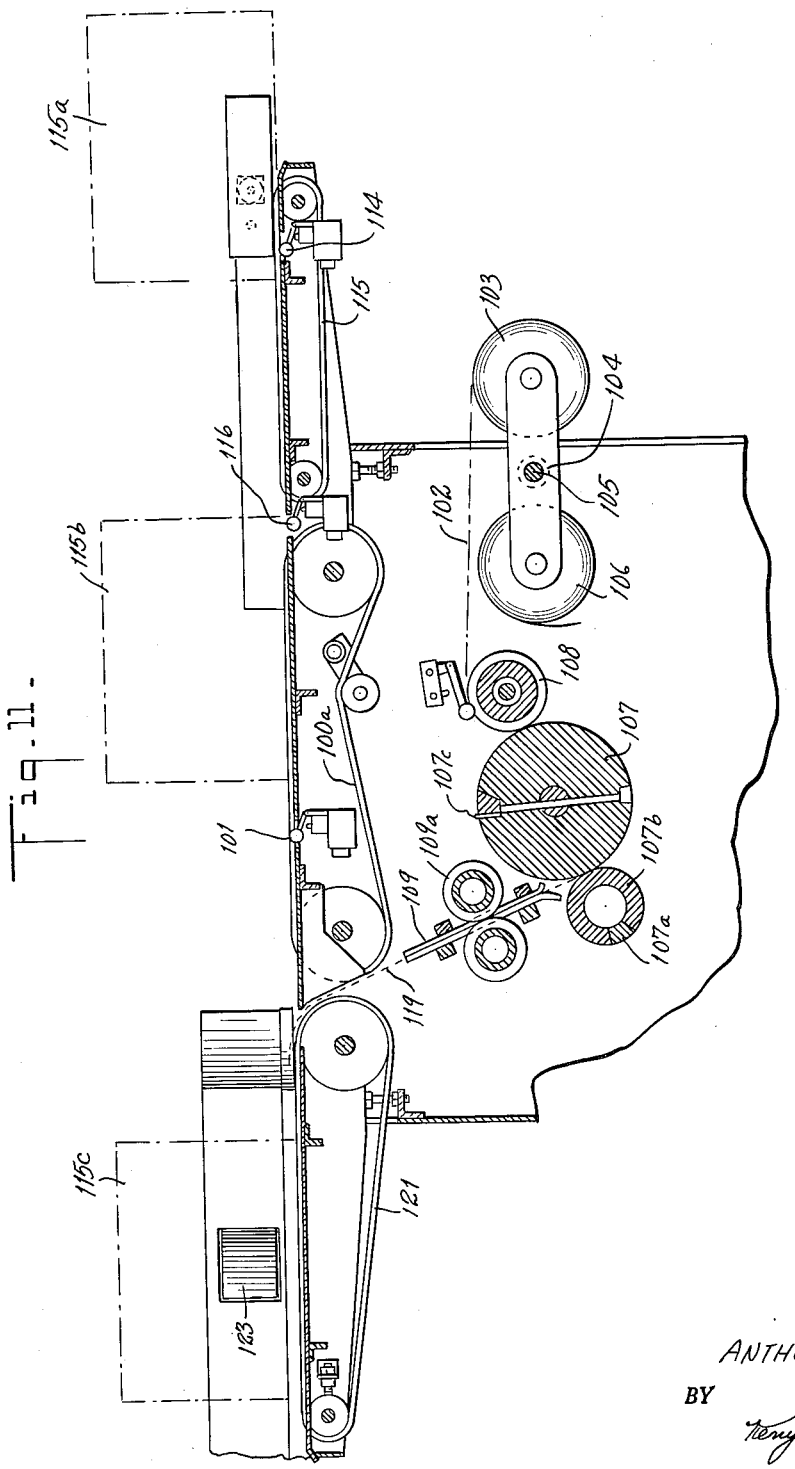
INVENTOR.
ANTHONY J. ZUERCHER
BY
Kenyon & Kenyon
ATTORNEYS

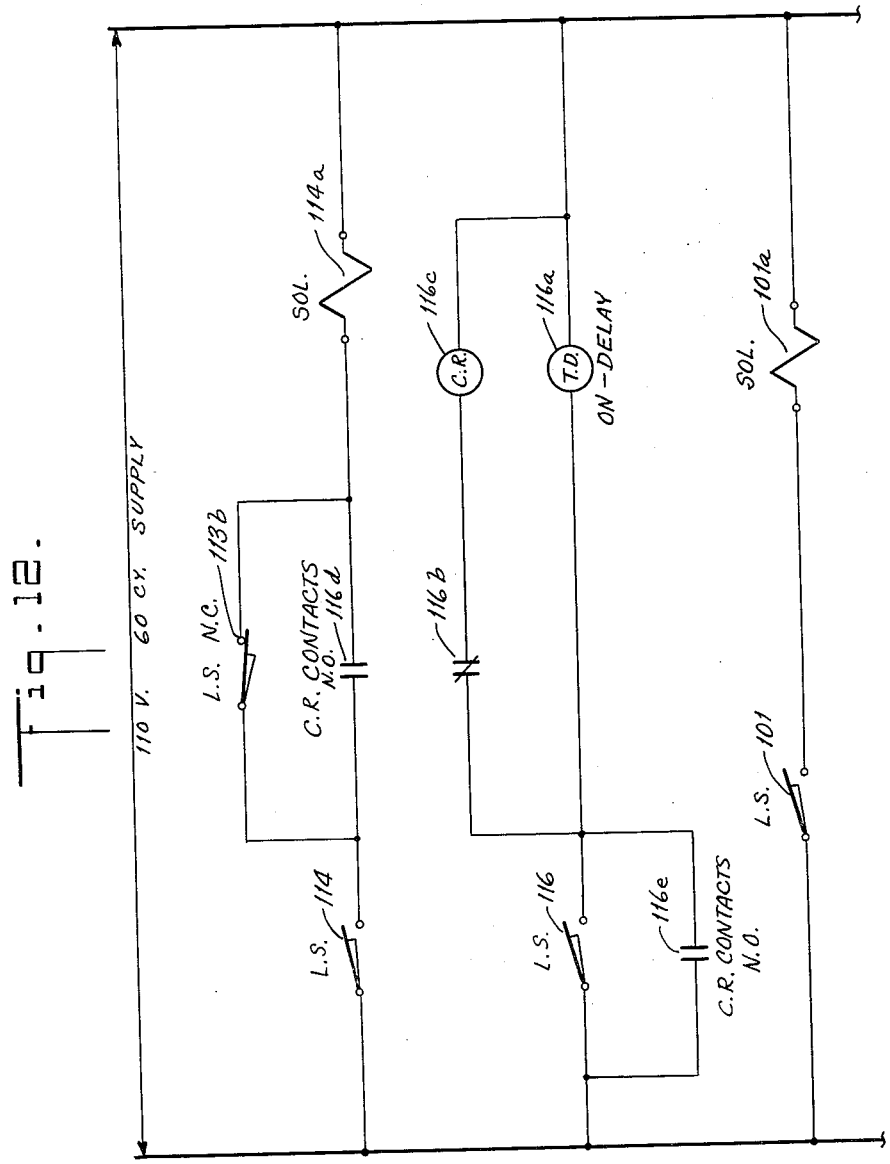

United States Patent Office 2,991,603
Patented July 11, 1961

2,991,603
STACK HANDLING MACHINE FOR NEWSPAPERS AND THE LIKE
Anthony J. Zuercher, Easton, Pa., assignor to T. W. & C. B. Sheridan Co., New York, N.Y., a corporation of New York
Filed Mar. 30, 1959, Ser. No. 802,960
11 Claims. (Cl. 53—55)

The present invention relates generally to newspaper stack handling machines and more particularly to apparatus adapted automatically to space incoming stacks of newspapers, to apply a bottom wrapper to the stack, form the bottm wrapper around the sides of the stack and form the stack prior to the tying operation.

This is a continuation-in-part of my copending application Ser. No. 635,895, filed January 23, 1957, now U.S. Patent No. 2,879,636.

In modern newspaper plants, papers delivered from the press are bundled to facilitate truck delivery and bulk mailing. To form the bundles, papers discharged from the press are gathered into stacks which are then placed between top and bottom covers consisting of eight to sixteen-page scrap sections, the covered stack being fed into a tying machine where it is firmly bound by wire. Normally, in standard mail rooms the paper stack will be made up of fifty folded newspapers, twenty-five of which will be reversed to even the pile. The height of the stack will vary from day to day, depending, of course, on the size of the daily edition. The formation of stacks and the stack-covering operation have heretofore been carried out manually, several operators being required to transfer papers from the press to the tying machine in condition for bundling.

In view of the foregoing it is the principal object of this invention to provide a wrapper machine for newspapers adapted to apply and form a bottom cover for a newspaper stack automatically and at relatively high speed. In addition it is an object to automatically space the stacks being fed to the tying machine by an amount, which when related to the speed at which the stacks are being fed permits the stacks to remain stationary while being tied but insures a steady flow of formed stacks with bottom wrappers thereon to the tying machine. A machine in accordance with the invention not only does away with the need for the manual wrapping of newspaper stacks but is also capable of increasing the rate of wrapping to at least twice that of existing manual techniques.

More particularly it is an object of the invention to apply and form a bottom cover for newspaper stacks prior to tying and to compensate automatically for the time required for the tying machine to operate.

Also an object of the invention is to provide an automatic wrapping machine adapted to operate in conjunction with a counting-stacking machine, thereby dispensing entirely with manual operations in the bundling of newspapers discharged from a high speed press. Thus the invention makes possible an automation system in which the printing and bundling of newspapers is carried out without manual intervention.

A further object of the invention is to provide a newspaper wrapper-applying machine of efficient and reliable design which may be manufactured and sold at relatively low cost to effect a substantial economy in mail room operations.

Briefly stated, in a preferred embodiment of a wrapping machine in accordance with the invention, a conveyor is provided to transport a stack of newspapers through a wrapping and tying station. Stack-spacing means are provided and a sheeter unit supplies a bottom sheet to the conveyor to engage the underside of the stack as it passed through the station and a stack and wrapper former holds the wrapper until the tying operation is completed.

Also there may optionally be provided at the station a feeder and applying mechanism which supplies a top cover to the top side of the stack, the applying mechanism being self-adjusting to the height of the stack. This top wrapper-applying means is more thoroughly described in my copending application Ser. No. 802,962 which is a division of my copending application Ser. No. 635,895, filed January 23, 1957, now U.S. Patent No. 2,879,636. In addition there may also be provided a deflector mechanism at the exit of the station which is adapted to divert stacks from the main conveyor onto a reject conveyor, the deflector being activated only when an improperly wrapped stack leaves the station. Preceding the station there may be a gate mechanism whose function would be to block the passage of stacks on the main conveyor in the event the feeder mechanism failed to pick up a top sheet for transfer to the oncoming stack.

For a better understanding of the invention as well as other objects and further features thereof, reference is had to the following detailed description to be read in conjunction with the accompanying drawings wherein like components in the several views are represented by like reference numbers.

In the drawings:

FIG. 4 is an enlarged view showing a detail of machine illustrated in FIG. 3;

FIG. 5 is an enlarged front view of the wrapping station of the machine;

FIG. 6 is an enlarged side view of the wrapping station;

FIG. 7 is a detail showing the gate mechanisms for the machine;

FIG. 11 is an elevation view in partial section of the device shown in FIG. 10;

FIG. 12 is a circuit diagram illustrating the interconnection of the electrical components of the stack spacer.

Figure 1:
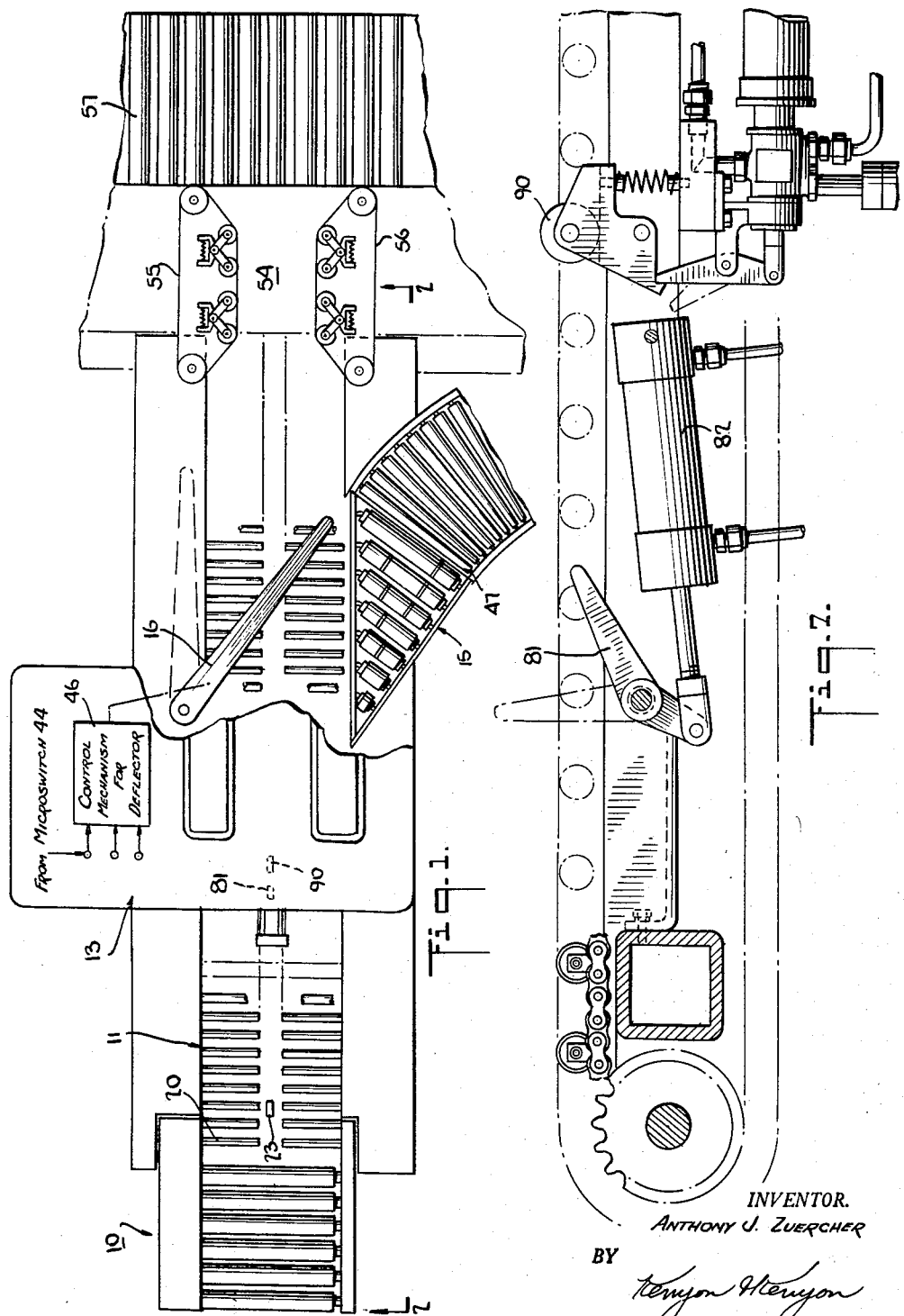
FIG. 1 is a plan view of a wrapping machine in accordance with the invention.

Referring now to FIGS. 1 to 4, the major components of the wrapper machine comprise an accelerating table, generally designated by numeral 10, a main conveyor 11, a bottom sheeter unit 12, a wrapper-applying station 13 which includes a pre-cut top wrapper feeder 14, a bundle reject conveyor 15, and a deflector 16 which acts to divert stacks from the main conveyor onto the reject conveyor 15 when the stacks are improperly wrapped. The stack being fed along the conveyor into the machine is represented by stack 17.

The details of the accelerating roller table 10, the main conveyor 11 and the bottom sheeter unit 13 may best be seen in FIG. 4. Placed on the accelerating roll table 10 is an unwrapped stack which may be fed in either manually or automatically from a counting-stacking machine, such as is currently manufactured by the Cutler-Hammer Company. Rotatably mounted on the table 10 are a series of rollers 18, chain driven from a common drive shaft 19. The table is pivotally mounted.

The function of the accelerating roll table at the input end of the machine is to impart an initial velocity to the incoming bundle and thereby to convey bundles from adjacent stacking machinery to the wrapper-applying station. The table pivots upwardly to afford access to roll stock spindles when replacing roll stock.

The main conveyor system 11, which is aligned with the rollers on the accelerating table, includes two parallel rows of rollers 20 having their axles journaled in end plates 21 which are secured to translating roller chains 22 driven through a suitable gear system from a common motor 52. Thus if movement of the stack is arrested on the conveyor, the rollers 20 will turn in a counter-clockwise direction while the chain 22 moves forwardly, whereby the stack will be maintained without disturbance at a fixed position despite continued movement of the chain.

Forward motion of a stack on the main conveyor trips a valve system supplying air to a cylinder-operated valve energizing a single revolution clutch which drives the bottom wrapper sheeter 12. This is accomplished by means of a trip wheel 23 which is rotatably mounted on a pivoted latch member 24, the latch being biased upwardly by a spring 25, whereby the wheel is elevated somewhat above the level of the rollers 20 in the main conveyor to intercept the oncoming stack.

Thus when the stack rides on trip wheel 23, the latch 24 is rocked about its pivot point to release a pawl 26 which normally engages the hook of the latch. Pawl 26 is linked to the plunger 27 of a valve 28 in an air cylinder system having an air intake duct 29. The air cylinder system, when tripped, acts to energize a single revolution clutch which may be of standard design (not shown). The clutch effects engagement between a drive mechanism and a sheeter cutter cylinder 30 whereby the cylinder makes one full revolution during which a bottom cover is cut from a web and spotted on the underside of the newspaper stack. The manner in which this is carried out will now be explained.

A web 31 of wrapper material, such as kraft paper, is drawn from a reel 32, the web passing under a danser roll 33 mounted on the end of an arm 34 pivotally supported at an eccentric point on the reel 32, the arm being spring-loaded to hold the web under tension. Correct tension on the web is maintained by a band brake 35 which is actuated in accordance with the angular position of the danser roll relative to the reel.

The web 31 drawn from the reel 32 passes under the danser roll 33 and over a metering roller 40, the web then going under the cutter cylinder 30 and passing upwardly through guides 36 where it is driven by a pair of spotting rolls 37 onto the conveyor rollers of the wrapper unit.

The sheeter cutter action is effected by a cutting rule 38, radially mounted on the cutter cylinder 30 and projecting outwardly therefrom. The rule bears against a cylindrical tool steel platen 39, the cutter cylinder and platen being supported for rotation in suitable bearings. Thus in the course of one revolution, when the cutting rule 38 engages the surface of the platen the web 31 is severed to provide the bottom cover for the stack.

The metering roller 40 is undercut to provide a circumferential groove 40a. Riding on the metering roller 40 is a microswitch wheel 41 mounted on the end of a pivoted actuator arm 42 which cooperates with the operating pin 43 of a microswitch element 44, such that should the paper web tear or the stock be depleted before completion of a run, the switch will close a circuit to an alarm and cause operation of the deflector 16. The manner in which this is carried out is as follows: The absence of paper on the metering roller due to a rupture in the web or the depletion of stock will permit the microswitch wheel 41 to fall into groove 40a, thereby dropping actuator arm 42 to release pin 43, the release of the pin operating microswitch 44. The operation of the microswitch closes a circuit in the control mechanism 46 for the deflector 16.

The control mechanism 46, represented in block form in FIG. 1, may be constituted by an air cylinder operated by a solenoid valve under the control of the microswitch 44. Alternatively, an electric motor system may be used under the control of the microswitch.

Deflector 16 acts to detour a bundle lacking a bottom wrapper onto the reject conveyor 15. This conveyor may consist of powered tapered rollers 47 mounted along a curved path leading to a storage area where manual corrections can be made before re-routing of the bundles back to the input end of the wrapping machine. Thus the absence of a wrapper, as sensed by microswitch 44, will cause deflection of the stack onto the reject conveyor 11.

Rollers 47 on the reject conveyor are driven by belts 48 coupled to a motor-driven shaft 49, which shaft is also operatively coupled through suitable gear boxes to the common shaft 19 for the conveyors as well as to the other driven elements of the machine, such as the bottom sheeter unit. Shaft 49 is rotated by the common motor 52 which also drives a suitable vacuum pump 53 connected to the vacuum systems of the machine.

The motor 52 also drives a bundle transfer conveyor 54 constituted by a pair of continuous belts 55 and 56, supported along spring-loaded rollers and acting to transfer the bundles, after covers are applied thereto at the wrapping station 13, to an output conveyor 57 leading to a tying machine.

Pre-cut wrappers 58, which may be individually addressed, are piled horizontally on a table 59 adjacent the wrapper station 13. The top wrappers are transported by a feeder mechanism 60, including sucker elements 61, to spotting rollers 62 and 63. The sucker elements attach to the leading edge of the wrapper, the top wrappers being maintained at a proper elevation for the suckers by a self-compensating feed action. As the bundles move down the main conveyor 11 they activate a tripper device 90 whose design may be similar to that of trip mechanism 23, the tripper device acting to energize a single revolution clutch for the top wrapper feeder mechanism 60, whereby the feeder supplies one top wrapper for each bundle fed into the wrapper station.

At the wrapper station there is arranged an applier mechanism constituted by a pair of applier arms each formed by an upper arm component 64, pivotally joined at an elbow 65 to a lower arm component 66. The lower arm movement is restricted by a suitable guide block slidable within vertical tracks 67. Movement of the applier arms is effected by a crank 68 connected to the upper extremity of the top arm components and pivotally connected to the piston 70 of an air cylinder 69. The arrangement is such that when the cylinder piston 70 is projected outwardly the applier arms are retracted to assume the position shown in dotted lines in FIG. 2 where the elbow 65 of the arms is raised within the upper hood 71. When the piston is drawn inwardly into the cylinder, the applier arms are extended downwardly in the manner shown in FIG. 1 so as to apply the top wrapper to the stack of newspapers.

As shown separately in FIGS. 5 and 6, the pre-cut top wrapper taken from pile 58 completes its travel beneath the retracted applier mechanism, powered by rubber tires on spotting rollers 62, 63 and surface contact with overhead belts 72 which pull the top wrapper across the bottom plate 76 until the leading edge of the wrapper makes contact with adjustable stops 73 and since the surface friction driving force of the belts 72 is all that is then moving the wrapper, contact with the adjustable stops 73 causes the wrapper to stop in position over the wrapping station. When the movement of the wrapper is stopped, the belts 72 slip over its surface.

After the wrapper stops, the air cylinder 69 is actuated, causing the lowering of the upper arm components 64 of the applier mechanism. Cam tracks 74 are attached to the lower arm components 66 as shown in FIG. 6 and initially contain roller 75a between them. Roller 75a is attached to the end of lever 75 by means of rotatable shaft 75b. Thus, as the lower arm components 66 are moved downwardly by the action of air cylinder 69 and crank 68, the lever 75 is rotated in a clockwise direction. The downward movement of the lower arm components 66, and hence cam tracks 74, thus cause the release of roller 75a which swings free of cam tracks 74. Linkage arms 75c, whose lower ends are coupled to the bottom plate 76 are also attached to shaft 75b. Therefore when lever 75 is rotated by the movement of roller 75a, effected by cam track 74 as the applier arms 66 move downwardly, the linkage arms 75c act to pull back the bottom plate 76 and provide a clearance for the downward travel of the applier mechanism and the top wrapper which is in place over the wrapping station.

Continued downward travel of the applier arms causes a trip 91 mounted on a gripper mechanism 77 straddled between the lower arm components to strike a latch 78, which action causes the gripper elements 79 to grasp the leading edge of the wrapper. Grippers 79 are constituted by curved fingers which are pivoted on a shaft 79a and are adapted to swing in the clockwise direction against a seat 79b, the wrapper edge being clamped between the fingers and the seat. The applier arms, carrying the top wrapper proceed downwardly, guided by tracks 60 until the rollers 80 on the gripper mechanism makes contact with the oncoming bundle adjacent the leading edge of the bundle.

Contact between the rollers 80 and the bundle triggers the grippers 79 open and releases the wrapper. This is accomplished by a linkage mechanism (not shown) which is caused to rotate shaft 79a in a counterclockwise direction to remove the gripper fingers 79 from the seat, this action occurring when the rollers 80 contact the top of the bundle.

To prevent excessive pressure between the applier mechanism and the bundle, a relief valve (not shown) is introduced in the down side of the air cylinder 69 such that when a set pressure is exceeded air is forced into the up side of the cylinder, thereby placing the applier mechanism in a state of equilibrium. The balance is upset after a predetermined interval after which the down side of the cylinder is exhausted and pressure is supplied to the up side. Near the end of the applier return stroke, the cams 74 again contact roller 75a on lever 75 to swing the lever 75 clockwise and thereby to close the bottom plate 76, which plate serves to support the incoming top wrapper.

When the wrapper-applying machine is running in conjunction with programed stacking, pre-cut and pre-addressed top wrappers will be applied in the same sequence as the bundles are fed in. Should the top wrapper feeder fail to supply a wrapper to the applier mechanism, a pneumatically operated gate 81 which is disposed in advance of the tripper device 90 on the main conveyor, as shown separately in FIG. 7, will obstruct the forward motion of the bundle, allowing the feeder to recycle until such time as a wrapper is in its proper position or an incoming bundle trips roller 23. In the latter case, the deflector 16 will be activated, the gate opened, and all subsequent bundles shunted onto the reject conveyor 15. If the wrapper is spotted in its proper position, the gate opens and a bundle with top and bottom wrappers are conveyed to the tying machine.

Missing top wrappers are detected to operate the gate or the deflector, the detection being made in connection with the suction system in the top wrapper feeder mechanism 60. Should the sucker elements 61 remain uncovered thereby indicating the absence of a wrapper, air pressure is directed to a valve arrangement to operate an air cylinder 82 which is linked to the gate 81 and which acts to raise the gate to obstruct the oncoming bundle. On the other hand, if the time at which the sucker element is found to be uncovered occurs when a signal is received from the valve of the trip mechanism 23, the deflector is operated rather than the gate. In other words, if the absence of a top wrapper is sensed at a time when the next oncoming stack has reached the trip mechanism 23, to prevent collision the deflector is actuated rather than the gate. If the suckers pick up a wrapper, vacuum builds up and air is directed to reset the feeder, the trip and the deflector.

Figure 8:
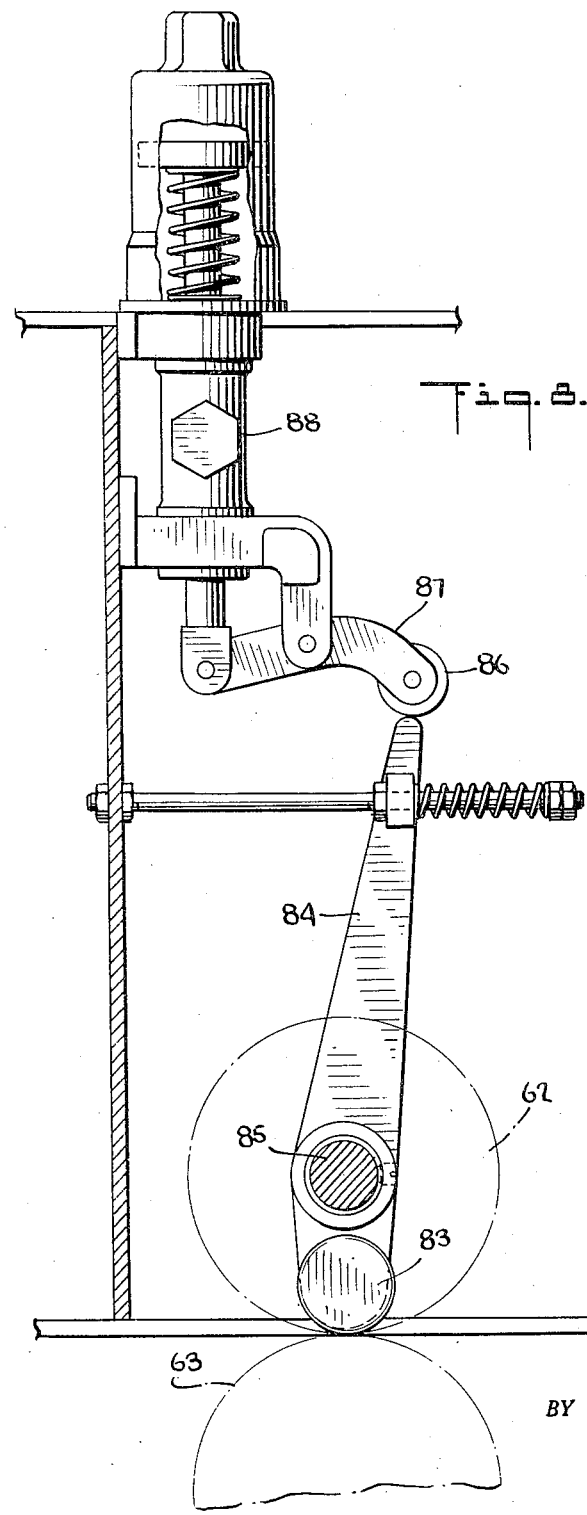
FIG. 8 is a detail showing the double wrapper detection mechanism.

When a double wrapper or more than two wrappers is inserted between the spotting rollers 62 and 63, as shown in FIG. 8, the increased thickness causes a roller 83 mounted on a lever 84 to swing out about the shaft 85 on which the spotting roller 62 is mounted, throwing the upper tip of the lever out of toggle with the roller 86 on the control mechanism for the deflector 16, thereby diverting the bundle with the double wrapper to the reject conveyor. The deflector system includes a memory or delay mechanism which is arranged in response to the actuation of valve 88 to remain operative to divert not only the stack containing the double wrapper but also the subsequent stack, the feeder being momentarily arrested. The deflector is thereafter opened provided a wrapper has been fed to the spotting rolls by the suckers. A similar mechanism, not shown, is arranged to act in response to triples or more, but in such case the feeder is neutralized since manual attention is required.

In summary, therefore, in the event a bundle is properly wrapped with top and bottom covers, it will pass through the wrapping station on the main conveyor for transfer to the tying station. But should a top wrapper not be picked up by the feeder mechanism, then the gate will be raised to obstruct the passage of the bundle into the wrapping station until such time as a wrapper is positioned by the feeder mechanism. And should the missing wrapper be detected after the bundle has passed the gate position, then the deflector will operate in response to a trip mechanism to divert the bundle to the reject or incomplete conveyor. Where a double wrapper is picked up, the deflector will operate to divert the double wrapped bundle as well as the next bundle, and the feeder mechanism will be arrested for one cycle. Similarly, should a bottom wrapper not be supplied to the wrapper station, the deflector will operate to detour the improperly wrapped bundle. Should a greater number of wrappers be picked up, the deflector will operate to divert all incoming bundles and the feeder neutralized until manual correction is made.

While the above described system is one which has many advantageous features, particularly the automatic rejection of improperly wrapped stacks, there are many instances in which it will not be necessary to provide such a high degree of accuracy. Thus it will not be necessary to provide for the reject conveyor and the deflector means described above. Particularly where the top wrappers to be applied are not pre-addressed it makes little or no difference whether one or more top wrappers is applied. However the top wrapping-applying means as described in my copending application Serial No. 802,962 has proved very satisfactory in operation and most instances where stacks all of a like quantity are being processed it is not necessary to provide the detecting means for denoting when more than one top wrapper is applied. In addition there are many instances when no top wrapper is necessary at all and it is desirable to provide a device which applies only a bottom wrapper.

Figure 9:
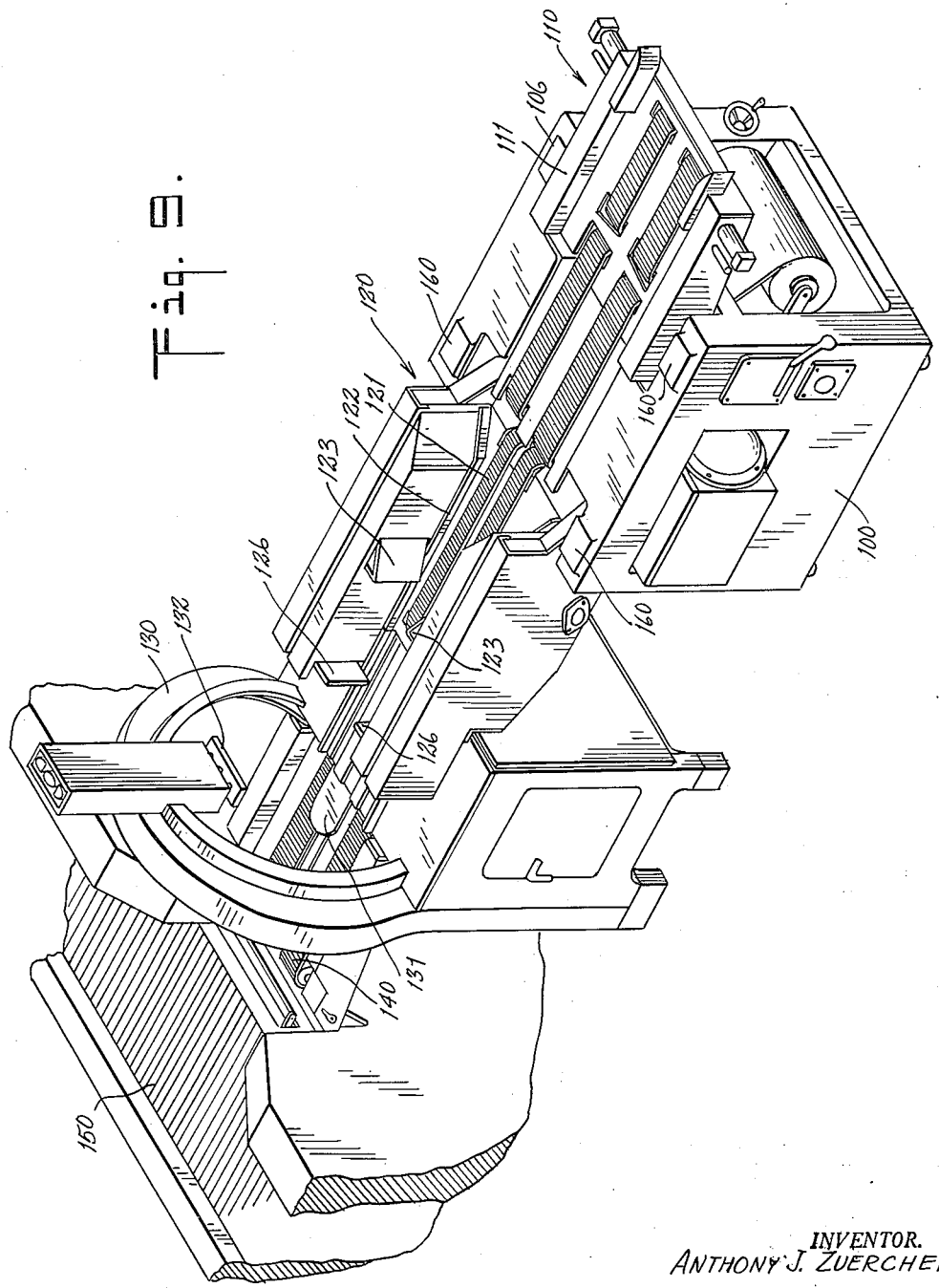
FIG. 9 is an isometric view showing the improved bottom wrapper-applying machine, stack spacer, inline feeder and stack and wrapper former of this invention.
Figure 10:
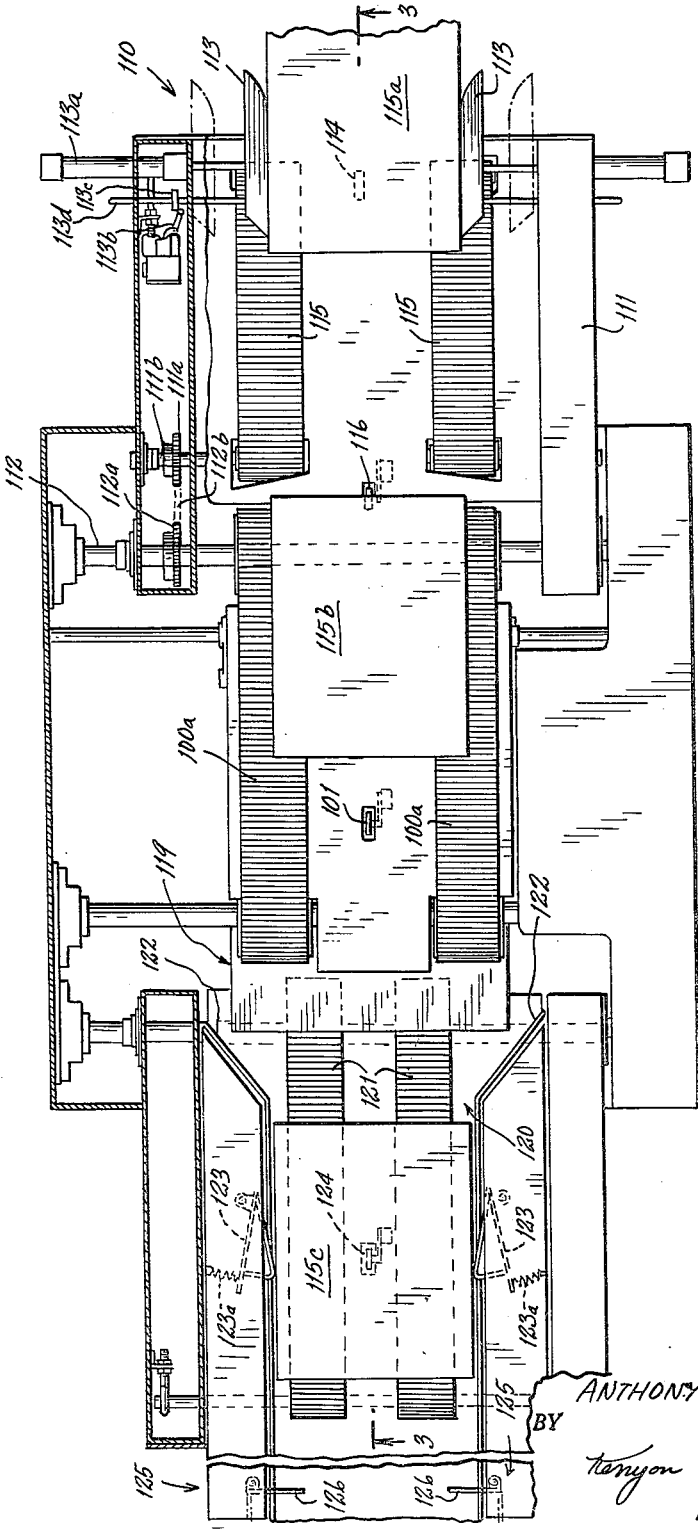
FIG. 10 is a top view in partial section of the portion of the device illustrated in FIG. 9 which precedes the tying machine.

Therefore the bottom wrapper applying machine has been modified slightly as shown in FIGS. 9, 10 and 11 to provide for means to space the stacks so that an uninterrupted flow to the tying machine is assured and to form the bottom wrapper so that it is held tightly against the sides of the stack until the tyer machine operation is completed.

Figure 2:
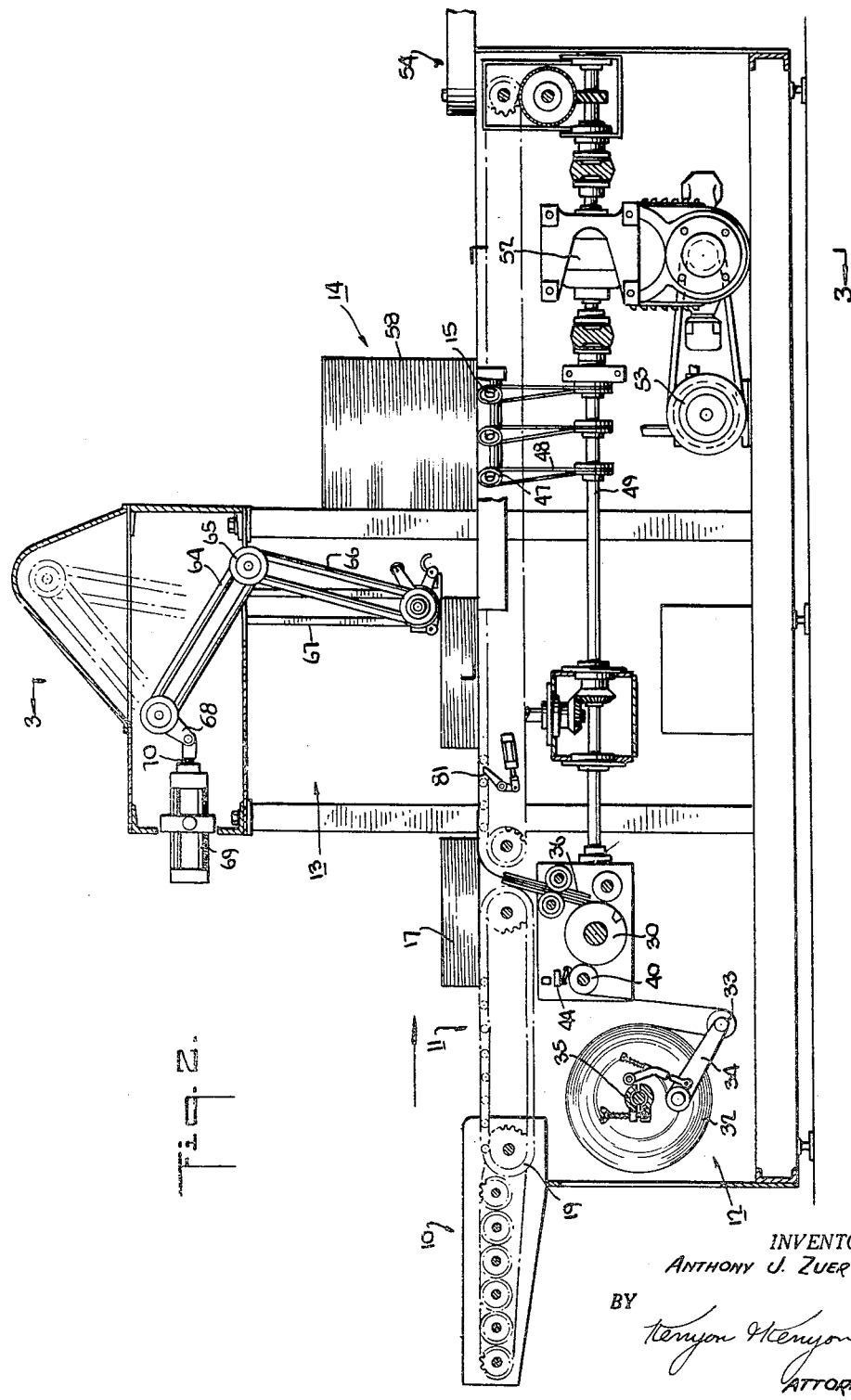
FIG. 2 is a longitudinal section taken of the machine along the plane indicated by line 2—2 in FIG. 1.
Figure 3:
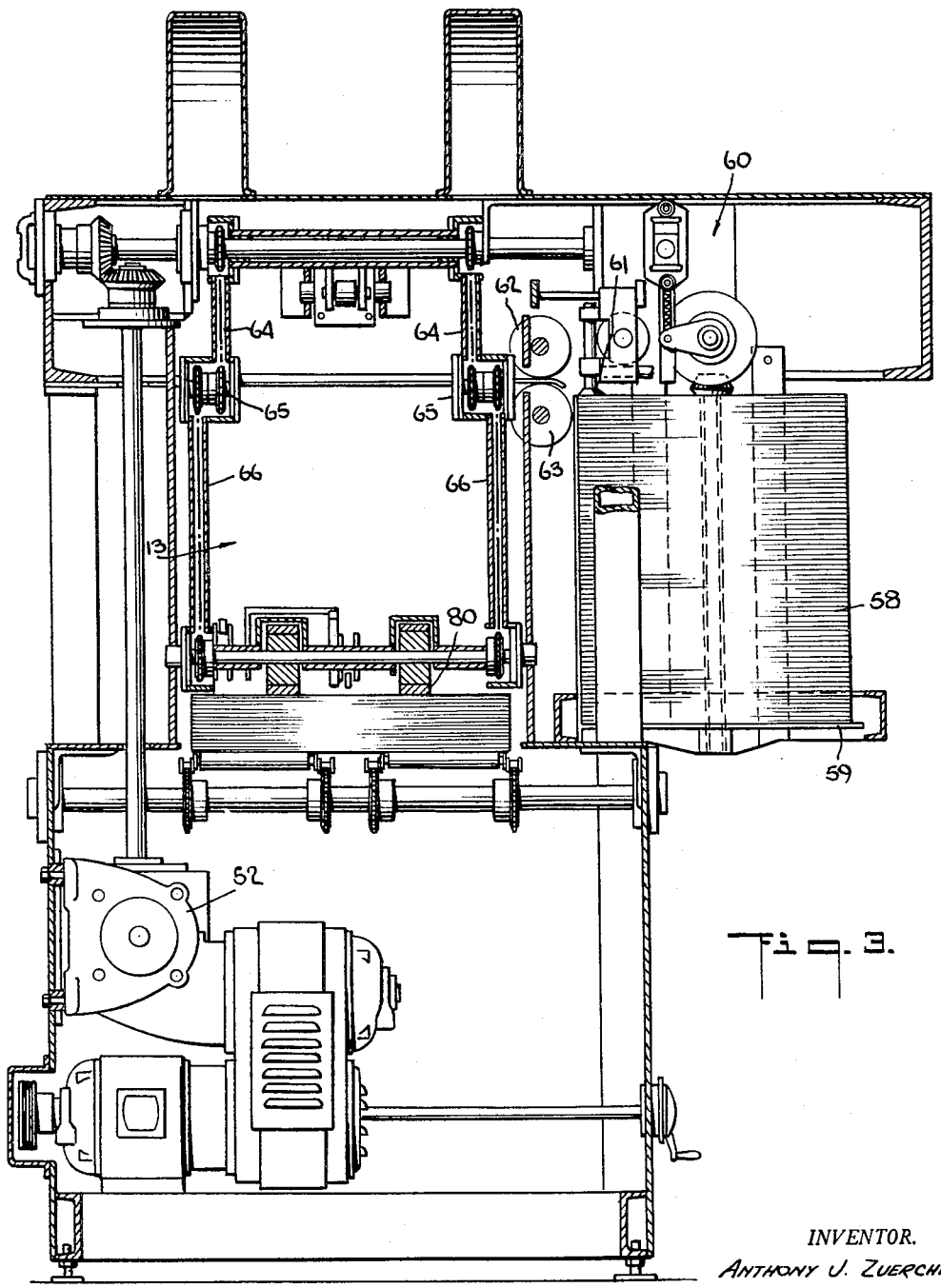
FIG. 3 is a transverse section taken along the plane indicated by line 3—3 in FIG. 2.

Referring now to FIGS. 9, 10 and 11 the bottom wrapper applier 100 is similar in operation and function to that illustrated in FIG. 2 with the exception that there is added a stack spacer device 110 and a stack and wrapper former 120, as well as other modifications in the bottom wrapper applier 100 as described below.

The stack spacer device 110 is made up of a hinged access conveyor section 111 which is journalled on the head pulley shaft 112 of the bottom wrapper applier 100. This permits the raising of the stack spacer device 110 to permit access to the interior portions of the system. A sprocket 112a on shaft 112 drives a chain 112b which in turn drives a sprocket 111a on conveyor shaft 111b. Thus a single power source (not shown) drives the conveyor belts 100a on the bottom wrapper applier machine 100 and belts 115.

Pneumatically operated shoes 113 are capable of assuming either of the two positions shown in FIG. 10, one of which is shown in dotted lines being the open condition and the other of which shown in solid lines indicates the closed condition.

A trip switch 114 which is normally positioned above the top of the stack spacer mechanism conveyor belts 115 is adapted to control the inward and outward movement of the shoes 113 to center a stack of newspapers as it passes from the counter stacker (not shown) to the bottom wrapper applier 100.

In addition the shoes 113 may operate to space the bundle 115 from the one preceding it. The purpose in providing a space between the stacks is so that the tyer machine 130 may be operated at optimum efficiency. The incoming stacks will normally have variable spacings between them. However the time required for the tyer machine 130 to cycle is fixed. Inasmuch as the stacks are being carried through the bottom wrapper applying machine 100 at a fixed rate, the spacing between the bundles 115a, 115b should be an amount which, when related to the speed at which the bundles are traveling, provides sufficient time for the tyer machine 130 to cycle. The space is necessary because during the tying operation the stack remains fixed and is only carried by the hinged access conveyor 140 to the feeder or dispatch conveyor 150 when the tying has been completed.

For example, if the tyer machine 130 requires 2 sec. to complete its cycle and the speed of movement of the stacks is 1 ft. per sec. then to achieve the optimum or maximum efficiency, the spacing of the stacks should be two feet. It may, of course, be desirable to make the spacing slightly more than the minimum to insure that the operation of the tyer machine 130 will be at near maximum efficiency and the flow of bundles through the wrapping and tying station is as rapid as practicable.

As may be seen in FIGS. 10, 11 and 12 when the stack 115a is in position over trip switch 114 a control signal energizes solenoid valve 114a permitting air to be supplied to cylinder 113a to cause shoes 113 to be extended and center the bundle 115a.

A limit switch 113b is operated by a lug 113c on guide pin 113d. Thus as shoes 113 are moved towards the center line of the station the lug 113c engages the switch 113b to cause it to open the circuit to solenoid valve 114a. This causes the shoes 113 to return to the open position.

However actuating switch 116, which is connected to a time delay relay 116a and is operated by the stack 115b, must have actuated the time delay relay 116a for a period of time sufficient for its normally closed contacts 116b to open. This interrupts the flow of current to control relay 116c which controls the opening and closing of normally open contacts 116d. Normally open holding contacts 116e are closed by actuating switch 116. Holding contacts 116e keep the time delay relay 116a in the circuit until a predetermined time interval elapses. Once the time interval elapses, contacts 116d open the circuit to solenoid valve 114a to retract cylinder 113a.

To summarize, the circuit shown in FIG. 12 acts in the dual capacity to both center incoming stacks and to provide a predetermined interval between stacks as they are carried through the wrapping station to the tying machine. An incoming stack 115a actuates trip switch 114 which, through either normally closed switch 113b or through contacts 116d, energizes solenoid valve 114a. The blank end of cylinder 113a receives air from the solenoid valve 114a and moves shoes 113 into contact with the incoming stack 115a. Since both shoes 113 move the same amount the stack is centered on the center line of the station. If contacts 116d are open, the lug 113c opens the switch 113b and the solenoid valve 114a is deenergized. On the other hand if contacts 116d are closed the solenoid valve 114a remains energized even though switch 113b is opened. As long as contacts 116d are held closed by time delay relay contacts 116b the solenoid valve 114a will continue to be energized and stack 115a will be held.

Contacts 116b are opened by the timing out of the time delay relay 116a. Time delay relay 116a is energized by the closing of switch 116 which also closes holding contacts 116e. Holding contacts 116e lock the circuit to render it independent of the position of stack 115b. Thus the opening of the circuit to solenoid valve 114a is controlled by either the automatic opening of switch 113b or the timing out of time delay relay 116a. By selecting the time delay interval of relay 116a the spacing between stacks coming into the bottom wrapper applier 100 may be accurately controlled. Thus the cooperation of switches 114, 113b and 116 is such as to insure that the optimum spacing between stacks will be maintained.

As the stacks are transported through the bottom wrapper applier 100 they contact a switch 101 which is connected to solenoid valve 101a. When solenoid valve 101a is energized it operates a single revolution clutch as described above. The single revolution clutch operates to draw a predetermined amount of the bottom wrapper web 102 from a supply roll 103.

The supply roll 103 as shown in FIG. 11 is mounted on an arm 104 which is pivotally carried on a shaft 105 and which has a separate supply roll 106 mounted on the other end thereof. The provision of the extra supply roll 106 makes possible the uninterrupted supply of the bottom wrapper web 102, since as roll 103 is exhausted the arm 104 may be rotated to carry the outer portion of the web on roll 106 to a position where it may act to supply the bottom wrapper. As seen in FIG. 11 if the arm 104 is rotated clockwise slightly the top of the roll 106 will contact the web 102. If a strip of cement or adhesive is applied to the top portion of roll 106 where it contacts the web 102 the operation of the single revolution clutch will act to draw paper from both rolls. On the cutting of the web 102 in back of the junction, the supply from roll 103 will be cut off and continued supply of the bottom wrapper from supply roll 106 is insured. A new supply roll may be placed on arm 104 at the operator's convenience.

The operation of the cutting cylinder 107, metering roller 108, the feeding rollers 108a and guides 109 is as described above in connection with the previously described embodiment, with the exception that a rubber insert 107a on covered cylinder 107b operates in conjunction with a saw tooth blade 107c to cut off the web into the desired lengths.

As the bottom wrapper 119 is fed upwards as shown in FIGS. 10 and 11 it meets a stack, both of which are carried by the conveyor belts 121 through the stack and wrapper former 120. Shaped flairs 122 on each side of the conveyor belts 121 act to force the outer edges of the bottom wrapper 119 up around the sides of the stack and hold it there as it passes through the stack and wrapper former 120.

Pivotal gates 123 on each side of the belts 121 swing inwardly as the stack 115c passes through the stack and wrapper former 120. Once the stack is past the gates 123 springs 123a force them to swing out behind the stack 115c. The stack trips switch 124 which actuates a single revolution clutch (not shown) which operates a pusher-feeder gear (not shown). The feeder gear meshes with a rack (not shown) attached to the sides 125 and all move towards the tyer machine 130 to carry the stack 115c into position to be tied. The sides 125 insure that the sides of stack 115c are properly formed since the spacing between them corresponds to the width of a stack. As the feeder reaches the end of its forward movement stops 126 are permitted to pivot as shown in dotted lines in FIG. 10 and the stack 115c is moved on to the bundle support 131 of the tyer machine 130. A cam associated with the single revolution clutch for the feeder mechanism actuates the tyer machine 130 when the feeder mechanism is at its forwardmost position. The first step in the tying operation is the movement of top pressure pad 132 onto the top of the stack. This holds the stack stationary and the feeder retracts before the wire is tied around the stack.

Once tied the pad 132 is retracted and the stops 126 in front of the next stack push the tied bundle onto the belts 141 of conveyor 140. Conveyor 140 carries the bundle to feeder or dispatch conveyor 150.

As may be seen in FIG. 9 mounting pads 160 are provided on the frame of the bottom wrapper applier 100 on which a top wrapper applying mechanism such as illustrated in FIGS. 2, 3, 5, 6 and 8 may be attached when it is desirable that a top wrapper be applied. In such an instance the operation of the top wrapper applier will be as described in my application Ser. No. 802,962

The top wrapper applier may or may not be used in connection with a reject conveyor and deflector as shown in FIG. 1 as desired.

To summarize the operation of the embodiments illustrated in FIGS. 9, 10, 11 and 12 the stack spacer mechanism 110 insures that the incoming stack to the bottom wrapper applier 100 are properly centered and spaced. The bottom wrapper applier 100 operates to supply a bottom cover sheet to the stack as it passes through the bottom wrapper applier machine 100. The stack and wrapper former 120 insures that the bottom wrapper 119 will be held in place around the stack and that the stack is properly formed prior to tying.

While there has been shown what is considered to be a preferred embodiment of this invention, it will be manifest to those skilled in the art that many changes and modifications may be made therein without departing from the spirit of this invention.

What is claimed is:

1. A newspaper stack handling system comprising a wrapping and tying station, conveyor means for transporting a stack of newspapers into and out of said station at a fixed rate of speed, wrapper means at said station for applying a bottom wrapper to said stack, tyer means for tying said stack after said bottom wrapper has been applied, said stack remaining stationary for the period of time said tyer means is in operation, and spacer means for spacing stacks apart by a distance related to the time a stack is stationary while being tied and the speed of operation of said conveyor, said spacer means comprising holding means at the infeed end of said conveyor means, incoming stack operated control means for energizing said holding means, and time delay means for deenergizing said holding means after a predetermined period of time.

2. A newspaper stack handling system comprising a wrapping and tying station, conveyor means for transporting a stack of newspapers into and out of said station at a fixed rate of speed, wrapper means at said station for applying a bottom wrapper to said stack, tyer means for tying said stack after said bottom wrapper has been applied, said stack remaining stationary for the period of time said tyer means is in operation, and spacer means for spacing stacks apart by a distance related to the time a stack is stationary while being tied and the speed of operation of said conveyor, said spacer means comprising holding means at the infeed end of said conveyor means including pneumatically operated shoe means for gripping and stopping an incoming stack, means for energizing said shoe means when a stack enters said station, and time delay and switch controlled means for de-energizing said shoe means and releasing said incoming stack when the stack preceding said incoming stack is spaced by at least said distance from it.

3. A newspaper stack handling system comprising a wrapping and tying station, conveyor means for transporting a stack of newspapers into and out of said station at a fixed rate of speed, wrapper means at said station for applying a bottom wrapper to said stack, tyer means for tying said stack after said bottom wrapper has been applied, said stack remaining stationary for the period of time said tyer means is in operation, and spacer means for spacing stacks apart by a distance related to the time a stack is stationary while being tied and the speed of operation of said conveyor, said spacer means comprising holding means at the infeed end of said conveyor means including pneumatically operated shoe means for gripping and stopping an incoming stack, means for energizing said shoe means when a stack enters said station, and time delay and switch controlled means for de-energizing said shoe means and releasing said incoming stack when the stack preceding said incoming stack is spaced by at least said distance from it, said shoe means being mounted on each side of said infeed end for movement towards the center line of said station for centering said stack on said conveyor.

4. A newspaper stack handling system comprising a wrapping and tying station, conveyor means for transporting a stack of newspapers into and out of said station at a fixed rate of speed, wrapper means at said station for applying a bottom wrapper to said stack, tyer means for tying said stack after said bottom wrapper has been applied, said stack remaining stationary for the period of time said tyer means is in operation, and spacer means for spacing stacks apart by a distance related to the time a stack is stationary while being tied and the speed of operation of said conveyor, said spacer means comprising holding and centering means at the infeed end of said conveyor means including shoe means carried on each side of a frame and mounted for limited movement towards the center line of said station, pneumatically operated means at the infeed end of said station for moving said shoes inwardly when an incoming stack enters said station to hold and center said stack on said conveyor means, energizing switch means operated by an incoming stack for actuating said pneumatic means located at said infeed end, time delay means for de-energizing said pneumatic means when de-energizing switch means is operated by the stack preceding said incoming stack when said preceding stack is a predetermined distance from said incoming stack.

5. A newspaper stack handling system comprising a wrapping and tying station, conveyor means for transporting a stack of newspapers into and out of said station at a fixed rate of speed, wrapper means at said station for applying a bottom wrapper to said stack, tyer means for tying said stack after said bottom wrapper has been applied, said stack remaining stationary for the period of time said tyer means is in operation, and spacer means for spacing stacks apart by a distance related to the time a stack is stationary while being tied and the speed of operation of said conveyor, stack and wrapper former means between said wrapper means and said tyer means for forming said bottom wrapper around the sides of a stack and forming said stack, said stack and wrapper former means comprising flair means for forming said bottom wrapper around the sides of said stack and registering means for registering the ends and sides of said stack.

6. A newspaper stack handling system comprising a wrapping and tying station, conveyor means for transporting a stack of newspapers into and out of said station at a fixed rate of speed, wrapper means at said station for applying a bottom wrapper to said stack, tyer means for tying said stack after said bottom wrapper has been applied, said stack remaining stationary for the period of time said tyer means is in operation, and spacer means for spacing stacks apart by a distance related to the time a stack is stationary while being tied and the speed of operation of said conveyor, stack and wrapper former means between said wrapper means and said tyer means for forming said bottom wrapper around the sides of a stack and forming said stack, said stack and wrapper former means comprising flair means for forming said bottom wrapper around the sides of said stack and registering means for registering the ends and sides of said stack, including pivoting gate means and stop means and side plate means for registering the sides of said stack.

7. A newspaper stack handling system comprising a wrapping and tying station, conveyor means for transporting a stack of newspapers into and out of said station at a fixed rate of speed, wrapper means at said station for applying a bottom wrapper to said stack including a rotatable spindle, arm means connected to the ends of said spindle, frame means for supporting said spindle and separate wrapper web supply rolls carried by the outer ends of said arms, metering and cut-off means actuated by trip means associated with said conveyor means for cutting off a predetermined length of said web to form a bottom wrapper and feeding means for positioning said bottom wrapper beneath said stack as it moves through said wrapping station, tyer means for tying said stack after said bottom wrapper has been applied, said stack remaining stationary for the period of time said tyer means is in operation, and spacer means preceding said wrapper applying means for spacing incoming stacks apart by a distance related to the time a stack is stationary while being tied and the speed of operation of said conveyor.

8. A newspaper stack handling system comprising a wrapping and tying station, conveyor means for transporting a stack of newspapers into and out of said station at a fixed rate of speed, wrapper means at said station for applying a bottom wrapper to said stack including a rotatable spindle, arm means connected to the ends of said spindle, frame means for supporting said spindle and separate wrapper web supply rolls carried by the outer ends of said arms, metering and cut-off means actuated by trip means associated with said conveyor means for cutting off a predetermined length of said web to form a bottom wrapper and feeding means for positioning said bottom wrapper beneath said stack as it moves through said wrapping station, tyer means for tying said stack after said bottom wrapper has been applied, said stack remaining stationary for the period of time said tyer means is in operation, and spacer means preceding said wrapper applying means for spacing incoming stacks apart by a distance related to the time a stack is stationary while being tied and the speed of operation of said conveyor, said spacer means comprising holding means at the infeed end of said conveyor means, incoming stack operated means for energizing said holding means, and time delay means for de-energizing said holding means to release said stack after a predetermined period of time.

9. A newspaper stack handling system comprising a wrapping and tying station, conveyor means for transporting a stack of newspapers into and out of said station at a fixed rate of speed, wrapper means at said station for applying a bottom wrapper to said stack including a rotatable spindle, arm means connected to the ends of said spindle, frame means for supporting said spindle and separate wrapper web supply rolls carried by the outer ends of said arms, metering and cut-off means actuated by trip means associated with said conveyor means for cutting off a predetermined length of said web to form a bottom wrapper and feeding means for positioning said bottom wrapper beneath said stack as it moves through said wrapping station, tyer means for tying said stack after said bottom wrapper has been applied, said stack remaining stationary for the period of time said tyer means is in operation, and spacer means preceding said wrapper applying means for spacing incoming stacks apart by a distance related to the time a stack is stationary while being tied and the speed of operation of said conveyor, said spacer means comprising holding means at the infeed end of said conveyor means including pneumatically operated shoe means for gripping and stopping an incoming stack, means associated with the infeed end of said conveyor means for energizing said pneumatic shoe means when a stack enters said station, and time delay and switch control means for de-energizing said shoe means and releasing said incoming stack when the stack preceding said incoming stack is spaced by at least said distance from it.

10. A newspaper stack handling system comprising a wrapping and tying station, conveyor means for transporting a stack of newspapers into and out of said station at a fixed rate of speed, wrapper means at said station for applying a bottom wrapper to said stack including a rotatable spindle, arm means connected to the ends of said spindle, frame means for supporting said spindle and separate wrapper web supply rolls carried by the outer ends of said arms, metering and cut-off means actuated by trip means associated with said conveyor means for cutting off a predetermined length of said web to form a bottom wrapper and feeding means for positioning said bottom wrapper beneath said stack as it moves through said wrapping station, tyer means for tying said stack after said bottom wrapper has been applied, said stack remaining stationary for the period of time said tyer means is in operation, and spacer means preceding said wrapper applying means for spacing incoming stacks apart by a distance related to the time a stack is stationary while being tied and the speed of operation of said conveyor, said spacer means comprising holding and centering means at the infeed end of said conveyor means including a frame, shoe means carried on each side of said frame and mounted for limited movement towards the center line of said station, incoming stack operated pneumatic means at the infeed end of said station for moving said shoes inwardly when an incoming stack enters said station to hold and center said stack on said conveyor means, and time delay means for de-energizing said pneumatic means after a predetermined interval.

11. A newspaper handling system comprising a wrapping station, conveyor means for transporting a stack of newspapers into and out of said station at a fixed rate of speed, wrapper means at said station for applying a bottom wrapper to said stack, wrapper former means for forming said bottom wrapper around the sides of said stack and holding said wrapper in position until said bundle is tied, tyer means for tying said stack after said bottom wrapper has been applied, said stack remaining stationary for the period of time said tyer means is in operation, and spacer means preceding said wrapper applying means for spacing incoming stacks apart by an interval related to the time a stack is stationary while being tied and the speed of operation of said conveyor, said spacer means comprising centering means at the infeed end of said conveyor means including a frame positioned adjacent said conveyor means, shoe means carried on each side of said frame and mounted for limited movement towards the center line of said station, pneumatic means for moving said shoes, and incoming stack operated energizing means for operating said pneumatic means to move said shoes into contact with said incoming stack to center it on said conveyor means, limit switch means associated with said shoe means for de-energizing said pneumatic means when said shoe means center said incoming stack and preceding bundle operated actuating means for overriding said limit switch means and for keeping said pneumatic means energized to hold said stack for a predetermined interval.

References Cited in the file of this patent

UNITED STATES PATENTS

| | | |
|---|---|---|
| 2,630,750 | Eberle | Mar. 10, 1953 |
| 2,636,654 | Sykes | Apr. 28, 1953 |
| 2,879,636 | Zuercher | Mar. 31, 1959 |
| 2,882,659 | Daniels | Apr. 21, 1959 |

UNITED STATES PATENT OFFICE
CERTIFICATE OF CORRECTION

Patent No. 2,991,603 — July 11, 1961

Anthony J. Zuercher

It is hereby certified that error appears in the above numbered patent requiring correction and that the said Letters Patent should read as corrected below.

Column 1, line 14, for "botttm" read -- bottom --; line 72, for "passed" read -- passes --; column 6, line 14, after "on" insert -- the actuating arm 87 of a valve 80 which acts to operate --.

Signed and sealed this 10th day of July 1962.

(SEAL)
Attest:

ERNEST W. SWIDER
Attesting Officer

DAVID L. LADD
Commissioner of Patents